(12) United States Patent
Kondo et al.

(10) Patent No.: US 11,176,749 B2
(45) Date of Patent: Nov. 16, 2021

(54) IN-VEHICLE DISPLAY DEVICE THREE-DIMENSIONAL IMAGE GENERATION

(71) Applicant: DENSO CORPORATION, Kariya (JP)

(72) Inventors: Toshiyuki Kondo, Kariya (JP); Fumihiko Murase, Kariya (JP); Masaaki Hirose, Kariya (JP); Kazunori Higuchi, Nagakute (JP); Yuji Muragishi, Nagakute (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/808,748

(22) Filed: Mar. 4, 2020

(65) Prior Publication Data

US 2020/0286292 A1 Sep. 10, 2020

(30) Foreign Application Priority Data

Mar. 7, 2019 (JP) .............................. JP2019-041250

(51) Int. Cl.
*G06T 19/00* (2011.01)
*G06F 3/01* (2006.01)
*G02B 27/01* (2006.01)
*G01C 21/36* (2006.01)

(52) U.S. Cl.
CPC .......... *G06T 19/006* (2013.01); *G01C 21/365* (2013.01); *G02B 27/0101* (2013.01); *G02B 27/0179* (2013.01); *G06F 3/013* (2013.01); *G02B 2027/0134* (2013.01); *G02B 2027/0138* (2013.01); *G02B 2027/0141* (2013.01); *G02B 2027/0187* (2013.01); *G06T 2215/16* (2013.01)

(58) Field of Classification Search
None
See application file for complete search history.

(56) References Cited

U.S. PATENT DOCUMENTS

| 10,725,308 | B1* | 7/2020 | Trail ....................... G06F 3/011 |
| 2010/0103075 | A1* | 4/2010 | Kalaboukis ......... G06F 3/04815 |
| | | | 345/8 |

(Continued)

FOREIGN PATENT DOCUMENTS

| JP | 2009-090689 A | 4/2009 |
| JP | 2016-158188 A | 9/2016 |

(Continued)

*Primary Examiner* — Jason A Pringle-Parker
(74) *Attorney, Agent, or Firm* — Maschoff Brennan (57) ABSTRACT

An imaging unit captures an image of a visual field. A detector detects a position of an eyeball and a sight line of an occupant. A visual point identifier identifies a position of a visual point of the occupant in the visual field, the eye position and the sight line direction. A measuring unit measures a position and a distance of an object included in the image of the visual field. An image generator generates display images based on the eye position and the position and the distance of the object. The display images are displayed on a virtual plane, fused on a fusion plane and displayed as a three-dimensional display on the visual field. The display images are generated to display the three-dimensional image at a given magnification ratio calculated by reducing a geometric display magnification ratio as the distance from the occupant increases.

6 Claims, 6 Drawing Sheets

(56) References Cited

U.S. PATENT DOCUMENTS

| | | | |
|---|---|---|---|
| 2013/0050258 A1* | 2/2013 | Liu | G06F 3/005 |
| | | | 345/633 |
| 2016/0152184 A1* | 6/2016 | Ogawa | B60R 1/00 |
| | | | 345/589 |
| 2017/0038595 A1* | 2/2017 | Kutomi | G09G 5/38 |
| 2018/0300952 A1* | 10/2018 | Evans | G06F 3/04845 |
| 2018/0330539 A1* | 11/2018 | Katagiri | G06T 15/50 |

FOREIGN PATENT DOCUMENTS

| | | |
|---|---|---|
| JP | 2016-186561 A | 10/2016 |
| JP | 2018-091908 A | 6/2018 |

* cited by examiner

IN-VEHICLE DISPLAY DEVICE THREE-DIMENSIONAL IMAGE GENERATION

CROSS-REFERENCE TO RELATED APPLICATION

This patent application is based on and claims priority to Japanese Patent Application No. 2019-041250, filed on Mar. 7, 2019 in the Japan Patent Office, the entire disclosure of which is hereby incorporated by reference herein.

BACKGROUND

Technical Field

The present disclosure relates to an in-vehicle display system, an in-vehicle display operating method and a non-transitory computer readable medium storing a program executing in-vehicle display.

Related Art

For the purpose of either reducing traffic accidents caused by inattentive driving or improving driver-friendliness, a known in-vehicle display system (e.g., HUD: Head-Up Display) superimposes a three-dimensional virtual image of an object to be recognized by a driver on a visual field in front of the driver to display a result of the superimposition in the visual field to let the driver visually recognize the object. For example, Japanese Patent Application Publication No. 2009-090689 (JP-2009-090689-A) discloses a technology in that a virtual image of an object is displayed together with its depth information in a visual field of a driver with its display size changed in accordance with a distance to the object.

However, in such a conventional in-vehicle display system, although the display size of the virtual image changes, the display size of the virtual image does not change in accordance with a change in actual distance to the object. That is, the conventional in-vehicle display system changes the display size of the virtual image simply to ease recognition thereof in the visual field in front of the driver by preventing the virtual image from becoming too small when the object is distanced. As a result, when a real image of the object in the visual field and the virtual image are superimposed and viewed, the driver generally feels discomfort regarding a depth thereof due to a difference in size therebetween, and the driver is likely to have difficulty recognizing the object.

Further, in other known HUDs employing a binocular parallax system, a display size of a three-dimensional virtual image is determined simply based on a visual angle (i.e., an angle formed by light beams emitted from an object and entering an eye) and is calculated based on a distance from an occupant to an object and a size of the object. However, in the latter HUD with the binocular parallax system, when the display size is geometrically reduced at a given ratio in accordance with the distance, deviation occurs between a size perceived by the driver and a size of the object as the distance increases. Hence, performance of perceiving the object can be degraded.

The present disclosure has been made to address the above-described problems and it is an object thereof to provide an in-vehicle display system, an in-vehicle display operating method and a non-transitory computer readable medium capable of assisting an occupant riding in a vehicle in improving performance of precepting an object in a visual field of the occupant.

SUMMARY

Accordingly, one aspect of the present disclosure provides a novel in-vehicle display system for superimposing a three-dimensional display indicating an object observed by an occupant riding in a vehicle) on a visual field of the occupant. The in-vehicle display system comprises an imaging unit to image a visual field and capture an image of the visual field; a detector to detect a position of an eyeball and a sight line of the occupant; and a visual point identifier to identify a position of a visual point of the occupant in the visual field based on the image of the visual field, the eye position and the sight line direction of the occupant. The in-vehicle display system further includes a measuring unit to measure a position and a distance of an object included in the image of the visual field based on the image of the visual field. The in-vehicle display system further includes an image generator to generate display images displayed on a virtual plane and fused by binocular parallax on a fusion plane to provide a three-dimensional display on a visual field. The image generator generates the display images at a given magnification ratio rate determined based on the eyeball position of the passenger and the position and the distance of the object. The given magnification ratio rate is calculated by increasingly reducing a geometrically determined magnification ratio rate, which is calculated simply based on a visual angle formed by the object, as a distance between the occupant and the object increases. The in-vehicle display system further includes an image display unit to display the display images generated by the image generator in the visual field of the occupant.

Another aspect of the present disclosure provides a novel method of superimposing a three-dimensional display on a visual field of an occupant riding in a vehicle. The method comprises the steps of: imaging a visual field of the occupant and capturing an image of the visual field; detecting an eyeball position and a sight line of the occupant; and identifying a position of a visual point of the occupant in the visual field based on the image of the visual field, the eyeball position and the sight line direction of the occupant. The method further comprises the step of measuring a position and a distance of an object included in the image of the visual field based on the image of the visual field. The method further comprises the step of calculating a given magnification ratio of a three-dimensional display to be displayed in the visual field by increasingly reducing a geometric magnification ratio, which is calculated simply based on a visual angle formed by the object, as the distance between the occupant and the object increases; The method further comprises the steps of generating display images to be displayed on a virtual plane, fused on a fusion plane, and displayed as the three-dimensional display at the given magnification ratio in the visual field; and displaying the three-dimensional display in the visual field of the occupant. The method further comprises the step of displaying the three-dimensional display in the visual field of the occupant.

Another aspect of the present disclosure provides a novel non-transitory computer readable medium storing program for controlling a computer to perform the above-described method of superimposing a fused three-dimensional display on a visual field of an occupant riding in a vehicle.

With such a configuration and a method, the image generator generates the display images to provide the three-dimensional displays fused and displayed in the field of view of the occupant. More specifically, the image generator generates the display images at a given magnification ratio increasingly decreasing as the distance between the occupant and the object increases as different from a geometrically determined size of three-dimensional displays (i.e., a geometrically determined magnification ratio). Here, the geometrically determined magnification ratio of the display size of the three-dimensional display represents a magnification ratio that constantly changes in accordance with the distance between the occupant and the object. By contrast, with the configuration of the present disclosure, since the magnification ratio is reduced in accordance with the distance between the occupant and the object, the image generator generates an increasingly smaller display image than a geometrically determined display size of the three-dimensional display as the distance between the occupant and the object increases. Hence, since the size of a fused three-dimensional display superimposed on the visual field of the occupant matches with a size perceived by the occupant, deviation between a size of the object in the visual field and the fused three-dimensional display displayed therein can be reduced. As a result, performance of perceiving the object by the occupant can be improved. Further, when the occupant does not drive the vehicle but acquires information on an object outside the vehicle, identification of the object is eased and perceptive performance thereof can be improved. As a result, the information on the object outside the vehicle 90 can be easily acquired again.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein.

DETAILED DESCRIPTION

Figure 1:
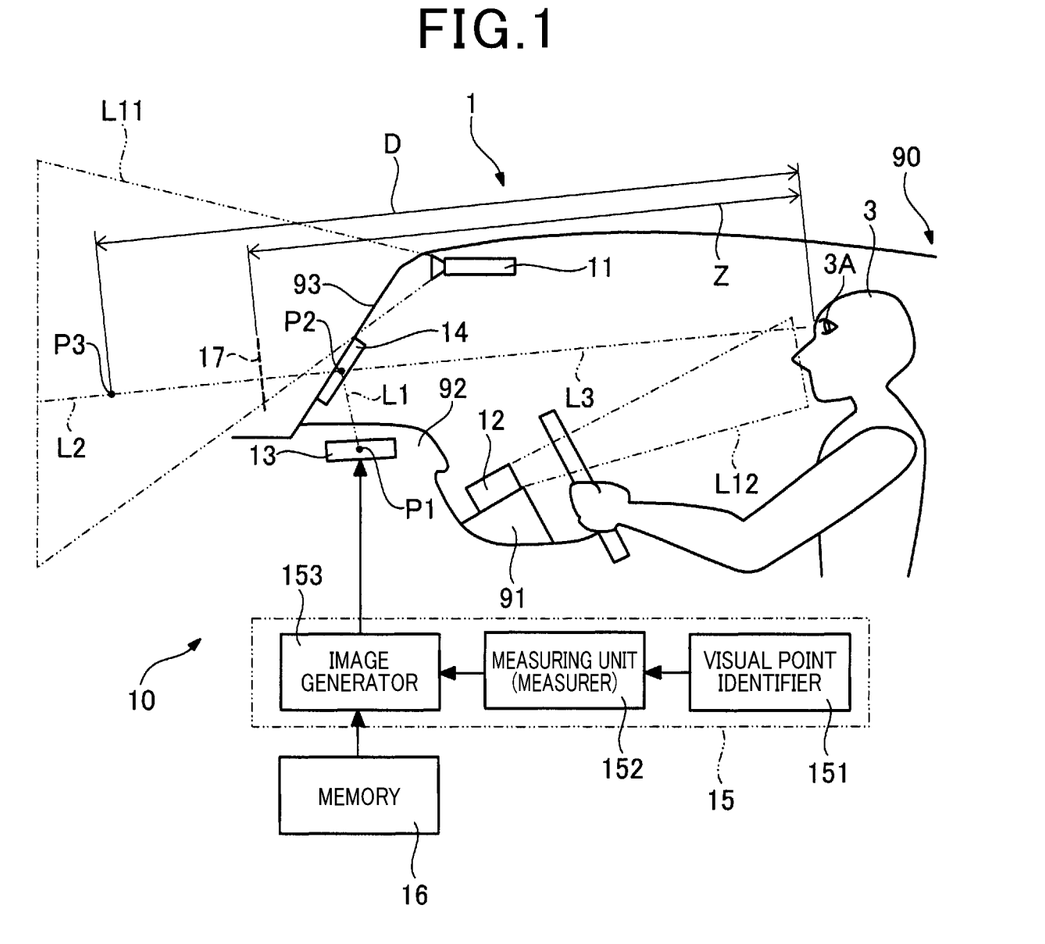
FIG. 1 is a diagram illustrating a schematic configuration of an exemplary in-vehicle display system according to a first embodiment of the present disclosure.

Referring now to the drawings, wherein like reference numerals designate identical or corresponding parts throughout the several views thereof, and to FIG. 1, a first embodiment of the present disclosure is described. That is, FIG. 1 is a diagram illustrating a schematic configuration of a vehicle system 1. As shown, the vehicle system 1 is composed of a vehicle 90 equipped with an in-vehicle display system (i.e., a HUD: Head-Up Display) 10. Hence, a user using the vehicle system 1, i.e., a driver 3 driving the vehicle 90, can visually recognize an image displayed by the in-vehicle display system 10 in a visual field in front of the driver. Specifically, in the vehicle system 1 of this embodiment, the driver 3 views a three-dimensional display of an object based on perception of an image displayed by the in-vehicle display system 10 in a state that the three-dimensional display is superimposed on his or her own visual field. Thus, the driver 3 can easily recognize the object.

The vehicle display system 10 includes an in-vehicle camera 11 disposed in the vehicle 90, a driver camera 12 mounted on a center console 91, and an emission unit 13 installed in a dashboard 92. The vehicle display system 10 also includes a reflective unit 14 inside a windshield 93. The vehicle display system 10 further includes a CPU (Central Processing Unit) 15 and a memory 16 connected to each of these devices.

The vehicle camera 11 captures an image of external scenery in a visual field in front of the driver 3. An image of the visual field captured by the in-vehicle camera 11 includes information on an object located in the visual field of the driver 3. For example, if it is a stationary, such as a traffic sign, etc., information on the object includes a size thereof, a shape thereof and a distance from the driver 3 or the like. By contrast, if it moves, information on the object includes a movement speed of the object and a direction of movement of the object or the like in addition to the size, the shape and the distance thereof. The driver camera 12 captures an image of an upper body of the driver 3 including his or her face, for example. The image of the upper body includes information on an eyeball position and a sight line direction of the driver 3.

The emission unit 13 may have a light source, a display element, and a projection optical system. The emission unit 13 emits a luminous flux including an image (hereinafter referred to as a projection light). The light source may be composed of a light emitting body, such as an LED (Light Emitting Diode), an EL display (Electroluminescent display), a laser, etc. The display element is composed of either a transparent type display element, such as an LCD (Liquid Crystal Display), a DMD (Digital Micromirror Device), a MEMS (Micro-electro-mechanical System), etc., or a self-luminous type display element, such as an EL display (Electroluminescent display), etc., for example. The display element projects an image based on date output from the CPU 15. An image projected by the display element is changed into a light flux (i.e., a projection light) by the light source. The projection optical system may have a projection lens and a mirror, for example, and adjusts a divergence angle of the projection light or the like. Hence, the emission unit 13 emits two binocular parallax projection lights to be projected to left and right eyes of the occupant, respectively, and fused and perceived by the occupant as a three-dimensional display.

Further, the reflective unit 14 may be composed of a combiner that partially reflects a light flux arriving at the reflective unit 14 while allowing a light from an external scenery to permeate through it. In this embodiment, although it is built in the inner side of the windshield 93, the reflective unit 14 can be fixed to either inner or outer side of the windshield 93. Yet otherwise, the reflective unit 14 can be separately disposed from the windshield 93. Hence, the reflective unit 14 reflects and directs the above-described two binocular parallax projection lights to the left and right eyes of the occupant, respectively.

The CPU 15 is connected to a ROM (Read Only Memory (not shown)) and a RAM (Random Access Memory (not shown)) and controls each part of the in-vehicle display system 10 by running computer program stored in the ROM and expanded in the RAM. Further, the CPU 15 functions as a visual point identifier 151, a measuring unit 152 and an image generator 153 as described below. That is, the visual point identifier 151 receives the image of the visual field acquired by the in-vehicle camera 11 and the image of the upper body of the driver 3 captured by the driver camera 12. The visual point identifier 151 then identifies a visual point position of the driver 3. The measuring unit 152 receives the image of the visual field captured by the vehicle camera 11 from the visual point identifier 151 and measures a position and a distance of the object located at the visual point of the driver 3 in the image of the visual field. The image generator 153 generates display images to be fused and displayed as a three-dimensional display on the visual field of the driver 3. A size of each of the display images is calculated based on the eyeball position of the driver 3 and the position and the distance of the object. Operation of the image generator 153 will be described later more in detailed.

Further, the memory 16 may be composed of a flash memory, a memory card and a hard disk. In the memory 16, information about characteristics of the human eye and operational expressions used in the display process described later in detail are stored in advance together. Here, the CPU 15 and the memory 16 can be included in an electronic control unit (ECU).

Figure 2:
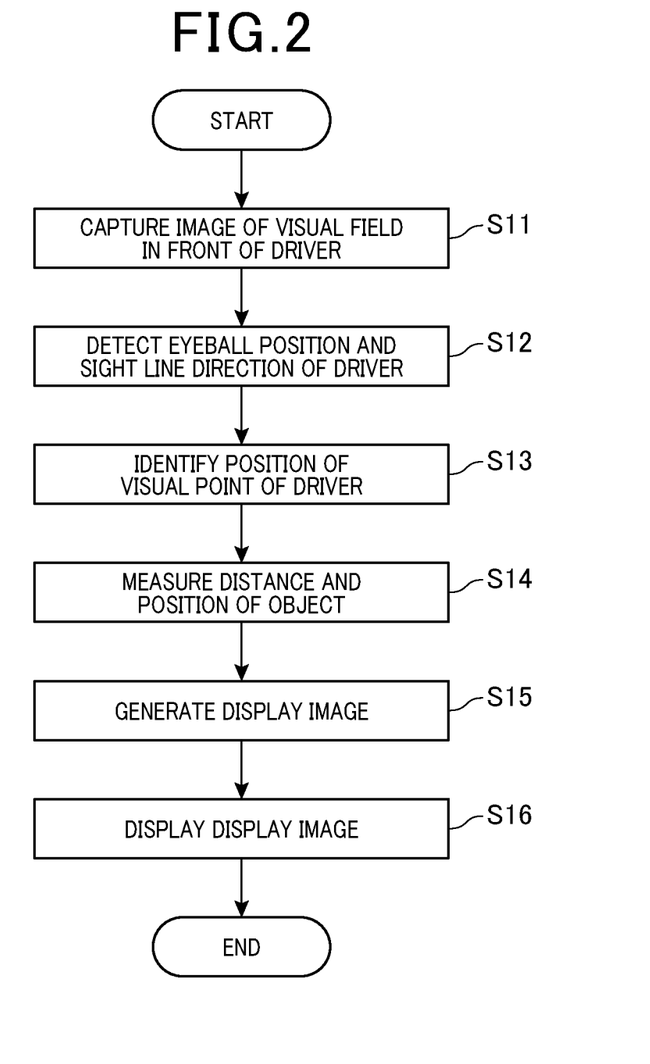
FIG. 2 is a flowchart illustrating an exemplary procedure of a display process executed in the first embodiment.

Now, an exemplary sequence of a display process is described with reference to FIG. 2. That is, FIG. 2 is a flowchart illustrating an exemplary sequence of the display process. The display process shown in FIG. 2 is a method of superimposing a three-dimensional display on a visual field of the driver 3, and can be executed at an arbitrary time. For example, the display process is executed after the in-vehicle display system 10 starts operate and is repeated as long as the in-vehicle display system 10 operates.

Hence, in step S11, an image of a visual field in front of the driver 3 is initially captured. Specifically, the in-vehicle camera 11 captures an image of external scenery of the visual field in front of the driver 3 (see two-dot broken line L11 in FIG. 1). Subsequently, the in-vehicle camera 11 outputs an image of the visual field to the CPU 15 as a captured image.

Subsequently, in step S12, the in-vehicle camera 11 detects both an eyeball position of the driver 3 and a sight line direction of the driver 3. More specifically, the driver camera 12 captures an image of the upper body of the driver 3 by including his or her face (see two-dot chain line L12 in FIG. 1). That is, since eyes of the driver 3 are included in the image of the upper body of the driver 3, the sight line direction and the eyeball position of the driver 3 can be detected together at the same time based on the image captured by the driver camera 12. The driver camera 12 then outputs the captured image of the upper body of the driver 3 to the CPU 15.

Subsequently, in step S13, the position of the visual point of the driver 3 is identified. Specifically, the visual point identifier 151 identifies the visual point of the driver 3 in the visual field in front of the driver 3 based on the image of the visual field obtained in step S11 and the image of the upper body of the driver 3 obtained in step S12. The visual point identifier 151 then outputs an identification result of identifying the visual point to the CPU 15.

Next, in step S14, a position and a distance of the object are measured. Specifically, the measuring unit 152 measures the position in the image of the visual field of the object located in the visual point of the driver 3 and the distance of the object from the driver 3 based on the image of the visual field obtained in step S11. The measuring unit 152 then outputs a result of measuring the position in the image of the visual field and the distance to the CPU 15.

Subsequently, in step S15, a display image is generated. Specifically, the image generator 153 generates the binocular parallax display images of the object to be displayed on a virtual plane, fused on a fusion plane and thereby being displayed as a three-dimensional display on the visual field of the driver 3. The binocular parallax display images are generated based on the upper body image of the driver 3 obtained in step S12 and the position and the distance of the object as measured in step S14. Further, in this embodiment, the image generator 153 generates the display images at a given magnification ratio calculated by increasingly reducing a magnification ratio-geometrically determined simply based on a visual angle formed by the object as the distance between the driver 3 and the object increases.

Now, an exemplary method of superimposing a three-dimensional display on external scenery in the visual field in front of the driver 3 performed by using the in-vehicle display system 10 of this embodiment is herein below described. First, as shown in FIG. 1, in the in-vehicle display system 10, an image projected by a display element (i.e., a point P1 in FIG. 1) included in an emission unit 13 is emitted in a state of a light flux by a light source also included therein as an projection light as shown by a two-dotted chain line L1. When it is reflected by a reflective unit 14 (i.e., a point P2 of FIG. 1), the projection light L1 is combined with an outer light L2 coming from the visual field in front of the driver 3 in the reflective unit 14. When a combined light L3 generated by coupling the projection light L1 to the outer light L2 reaches the eyeball 3A of the driver 3, the driver 3 can view a three-dimensional display and external scenery at the same time in a state that the image generated by the projection light L1 and the external scenery generated by the outer light L2 are superimposed.

Hence, when the combined light L3 arrives at the eyeball 3A of the driver 3, the image caused by the projection light L1 included therein is viewed as if it is displayed on a virtual display plane 17 (see FIG. 1) virtually formed at a position distanced in a direction in which the coupling light L3 and the outer light L2 proceed by a distance Z from the eyeball 3A of the driver 3. The distance Z is equivalent to a distance from the eyeball 3A of the driver 3 to the point P1 through the point P2.

Figure 3A:
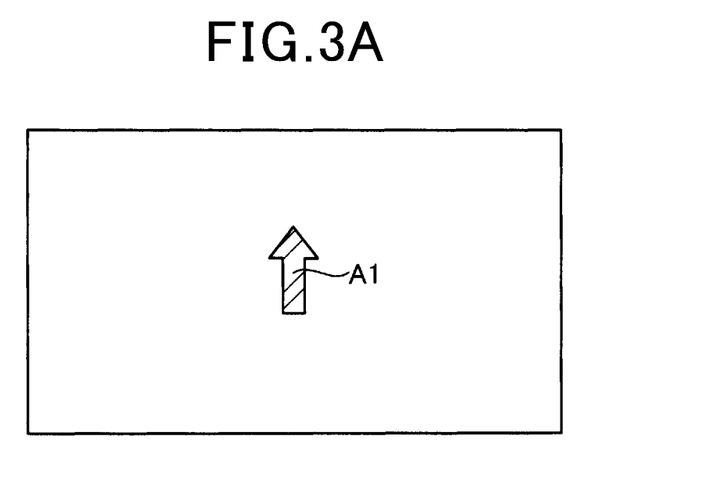
FIGS. 3A and 3B are diagrams collectively illustrating a relation between sight lines of both eyes when a display image is displayed as a plane (i.e., two-dimensional) display and is superimposed on a visual field.
Figure 3B:
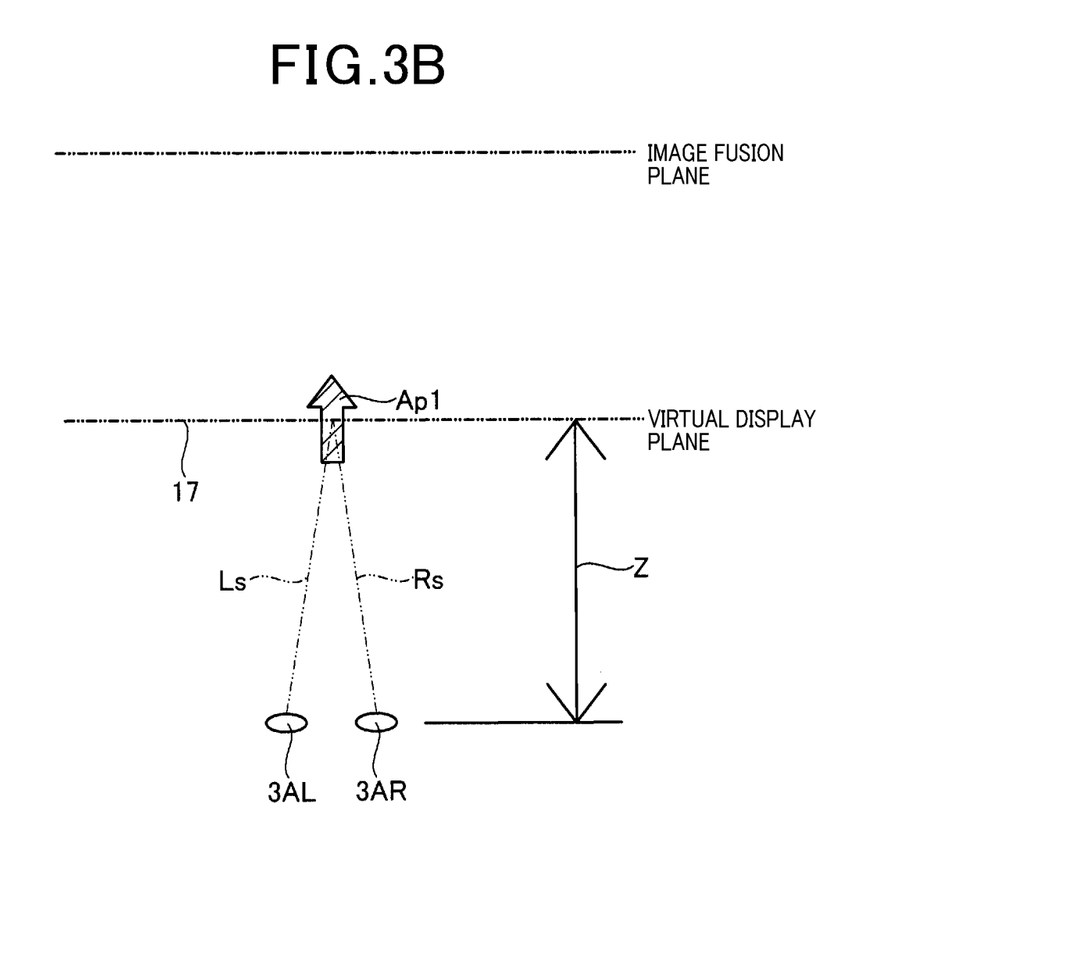

FIGS. 3A and 3B are diagrams collectively illustrating a relation between sight lines of both eyes when a two-dimensional display is superimposed on a visual field of the driver 3. Specifically, FIG. 3A shows a display image projected by the emission unit 13 when the driver 3 views the two-dimensional display caused by the coupling light L3. Here, as shown, an arrow A1 acts as one example of the display image. When the display image of FIG. 3A is emitted by the emission unit 13, the display image of FIG. 3A is projected on the virtual display plane 17. When the display image of FIG. 3A is projected on the virtual display plane 17, sight lines Rs and Ls of two eyeballs 3AR and 3AL of the driver 3 intersect with each other on the virtual display plane 17 as shown in FIG. 3B. That is, since these two eyeballs 3AR and 3AL of the driver 3 see the single arrow A1 on the virtual display plane 17, the driver 3 visually recognizes the arrow Ap1 as the two-dimensional display in a state that the arrow Ap1 is superimposed on the external scenery of the visual field in front of the driver 3.

By contrast, when a three-dimensional display is superimposed on the visual field of the driver 3, the in-vehicle display system 10 displays images on the virtual display plane 17 so that sight lines Rs and Ls of the eyeballs 3AR and 3AL of the driver 3 intersect with each other at a different position from the virtual display plane 17. Here, when the driver 3 closely observes a visual point P3 in a situation shown in FIG. 1, a distance from the eyeball 3A of the driver 3 to the visual point P3 provides an image fusion distance D. The image fusion distance D can be greater than the distance Z between the eyeball 3A and the virtual display plane 17.

Figure 4A:
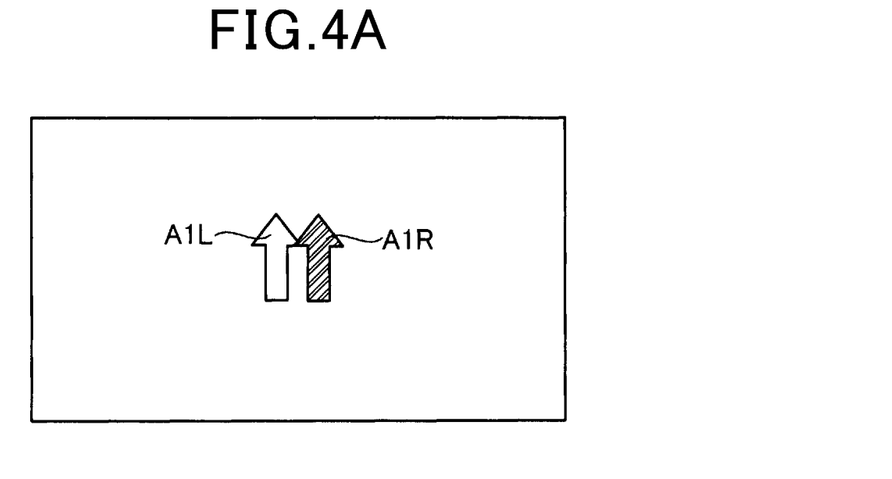
FIGS. 4A and 4B are diagrams collectively illustrating a relation between sight lines of both eyes when display images are displayed and fused as a three-dimensional display superimposed on the visual field.
Figure 4B:
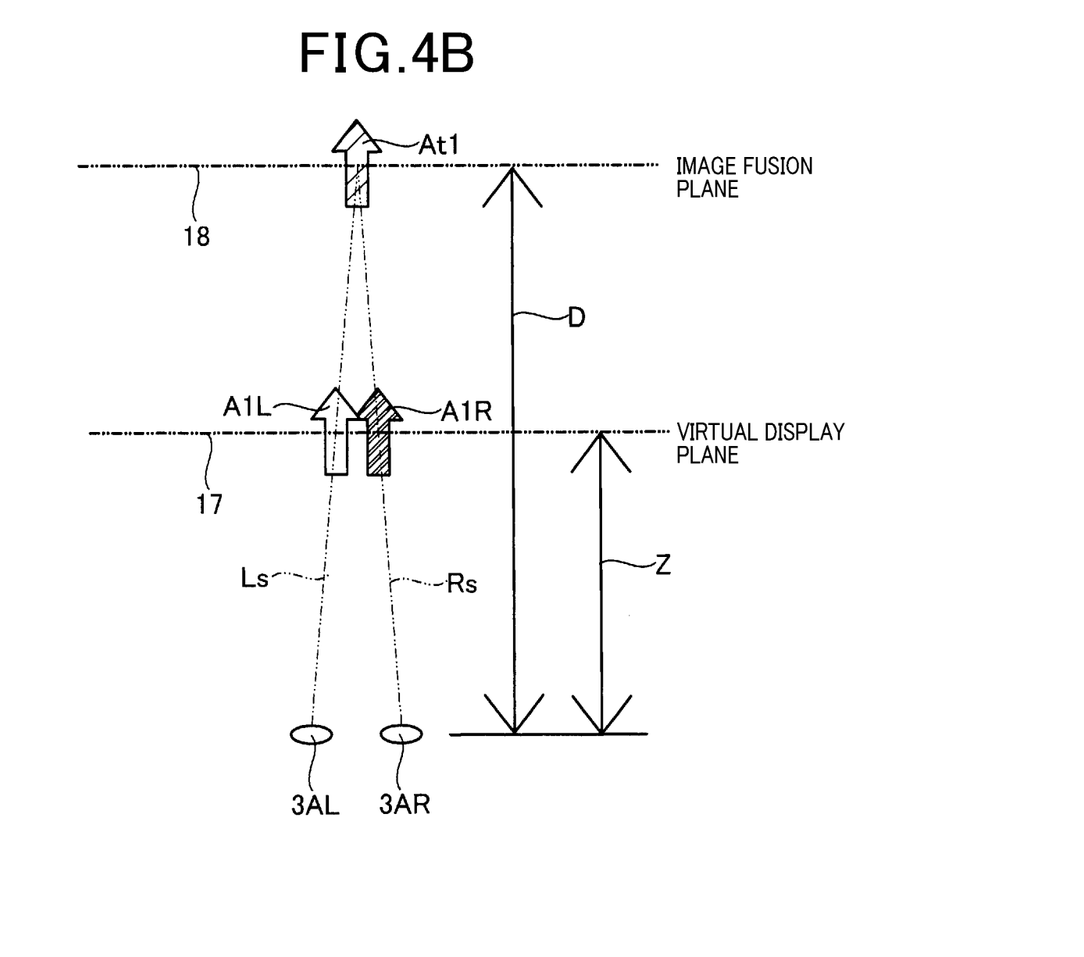

FIGS. 4A and 4B are diagrams collectively illustrating a relation between the sight lines of the respective eyes when the three-dimensional display is superimposed on a visual field of the driver 3. Specifically, when the three-dimensional display is projected on the visual field of the driver 3, the emission unit 13 projects display image as shown in FIG. 4A. As shown in FIG. 4A, two arrows MR and A1L visible to the eyeballs 3AR and 3AL of the driver 3, respectively, are separately displayed. FIG. 4B shows a relation between sight lines Rs and Ls of the two eyeballs 3AR and 3AL when the display image of FIG. 4A is displayed on the virtual display plane 17. As shown in FIG. 4B, the sight line Rs of the eyeball 3AR visually recognizes the arrow A1R, and the sight line of the eyeball 3AL visually recognizes the arrow A1L. The sight line Rs of the eyeball 3AR and the sight line Ls of the eyeball 3AL intersect at a position on the image fusion plane 18 separated from the driver 3 by the image fusion distance D, so that a fused arrow At1 is perceived at the position. Thus, the driver 3 can visually recognize the arrow At1 of the three-dimensional display at the visual point P3 shown in FIG. 1. In such a situation, the image fusion distance D can be changed by changing an interval between the arrow A1R and the arrow A1L on the virtual display plane 17.

In this embodiment, as described heretofore, the in-vehicle display system 10 displays the fused three-dimensional display in the external scenery of the visual field in front of the driver 3. In such a situation, the image generator 153 generates display images used to provide a three-dimensional display at a given magnification ratio calculated by reducing a geometric magnification ratio in accordance with a distance between the driver 3 and the object.

Figure 5:
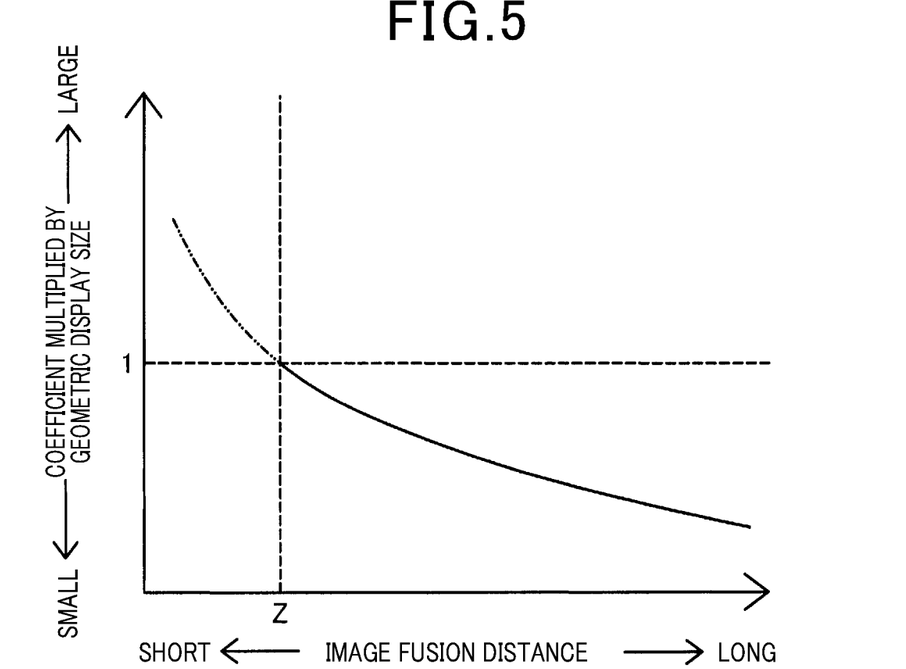
FIG. 5 is a graph illustrating a relation between an image fusion distance and a coefficient multiplied by a display size.

FIG. 5 illustrates a relation between the image fusion distance and a coefficient to be multiplied by a geometric display size, referred to when a magnification ratio of display images generated by an image generator 153 is determined during the display process executed in this embodiment. As a human perception characteristic, it is known that a perception size perceived in a manner of a three-dimensional view based on a binocular parallax increases as a fusion image distance increases. In view of this, in the display process of this embodiment, display images are generated based on a relation between the image fusion distance and a magnification coefficient multiplied by a geometric display size shown in FIG. 5 by using the below described first expression.

$H(x) = H_0 \times f(x)$

In the first expression, H(x) represents a size of a three-dimensional display and serves as a calculation basis when a size of a display image generated by the image generator 153 to provide the three-dimensional display fused later is calculated. Also, the $H_0$ represents a geometrically determined size of a display displayed on a virtual display plane 17 distanced from the driver by a distance Z. Further, f(x) represents a formula composed of a distance x as a variable and defines a curve as shown in FIG. 5. Hence, as shown in FIG. 5, when the distance x is equivalent to the distance Z, the magnification coefficient multiplied by the geometric display size is one (i.e., 1). However, as the distance x increases and exceeds the distance Z, the magnification coefficient multiplied by the geometric display size decreases. Here, when the magnification coefficient multiplied by the geometric display size is one, an image fusion distance is preferably equal to a display distance calculated when the three-dimensional display (i.e., the binocular parallax) is not used.

Further, in this embodiment, the image generator 153 of the in-vehicle display system 10 generates display images used to provide a three-dimensional display fused later such that a ratio of increase in brightness of the three-dimensional display increases in accordance with a distance between the driver 3 and the object.

Figure 6:
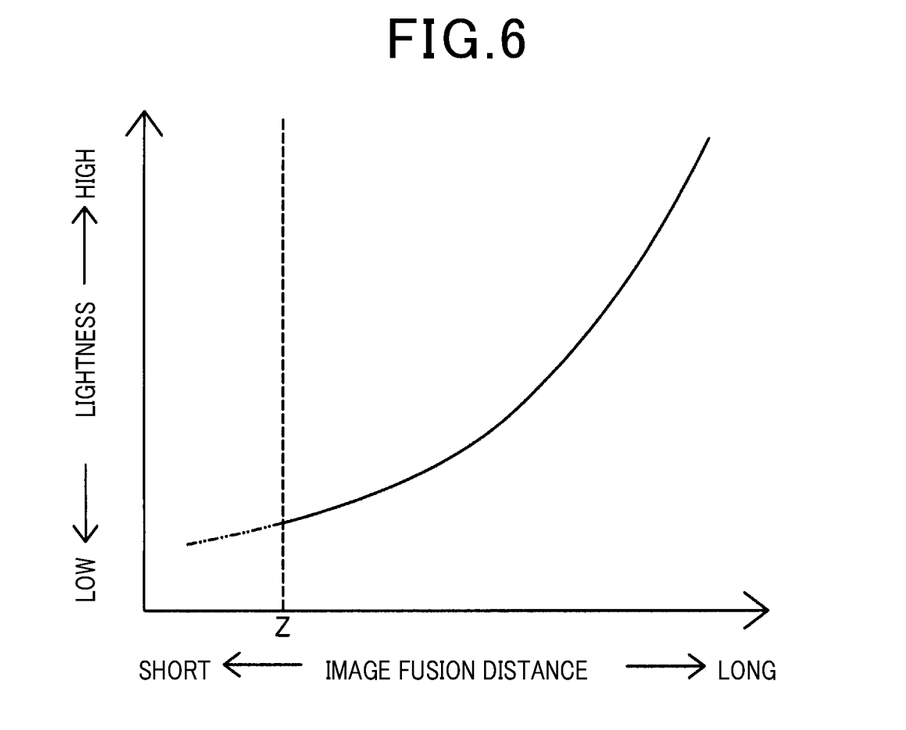
FIG. 6 is a graph illustrating a relation between the image fusion distance and brightness.

That is, FIG. 6 illustrates a relation between an image fusion distance and brightness referred to during a display process executed in this embodiment. Here, as a human perception characteristic, it is known that as an image fusion distance increases, an object is increasingly perceived being darker when a three-dimensional viewing is used based on a binocular parallax. In view of this, in a display process of this embodiment, a display image is generated based on the relation between the image fusion distance and brightness of a three-dimensional display shown in FIG. 6 by using the below described second expression.

$M(x) = M_0 \times g(x)$

In the second expression, M(x) represents brightness of a three-dimensional display when an object is distanced from a driver 3 by a distance x. Thus, M(x) serves as a basis of calculating brightness of the display image generated by the image generator 153 in view of fusion of the three-dimensional display. Also, in the second expression, $M_0$ represents brightness of a two-dimensional display displayed on a virtual display plane 17. g(x) is an expression composed of a distance x as a variable to draw a curve as shown in FIG. 6. Hence, as shown in FIG. 6, as the distance x increases and exceeds the distance Z, the brightness increases. Further, a ratio of increase in brightness increases in accordance with the distance x.

Hence, the image generator 153 generates display images based on the distance x (i.e., a distance from the driver 3) to an object and the first and second expressions stored in the memory 16 to appropriately fuse and generate the three-dimensional display at the visual point P3. Specifically, the image generator 153 increasingly reduces a magnification coefficient multiplied by the geometric display size as the distance x serving as a distance from a driver 3 to the object increases. The image generator 153 also increases brightness more than that of a two-dimensional display displayed on the virtual display plane 17. More specifically, in such a situation, each of the display image is generated at the given magnification coefficient multiplied by the geometric display size decreasing in accordance with the distance x while increasing brightness of the three-dimensional display also in accordance with the distance x. Then, the image generator 153 outputs the display image as generated in this way to the emission unit 13.

Subsequently, as illustrated in FIG. 2, in step S16, the display image generated in step S15 is displayed in the visual field of the driver 3. Specifically, the display element of the emission unit 13 forms display image based on the display image generated by the image generator 153 and emits those as a projection light L1 to the reflective unit 14. As shown in FIG. 1, when it is reflected by the reflective unit 14, the projection light L1 is combined with an outer light L2 and these collectively arrive at the eyeball 3A of the driver 3. Hence, the driver 3 can visually recognize the three-dimensional display superimposed on the external scenery of the visual field in front of the driver 3.

Figure 7:
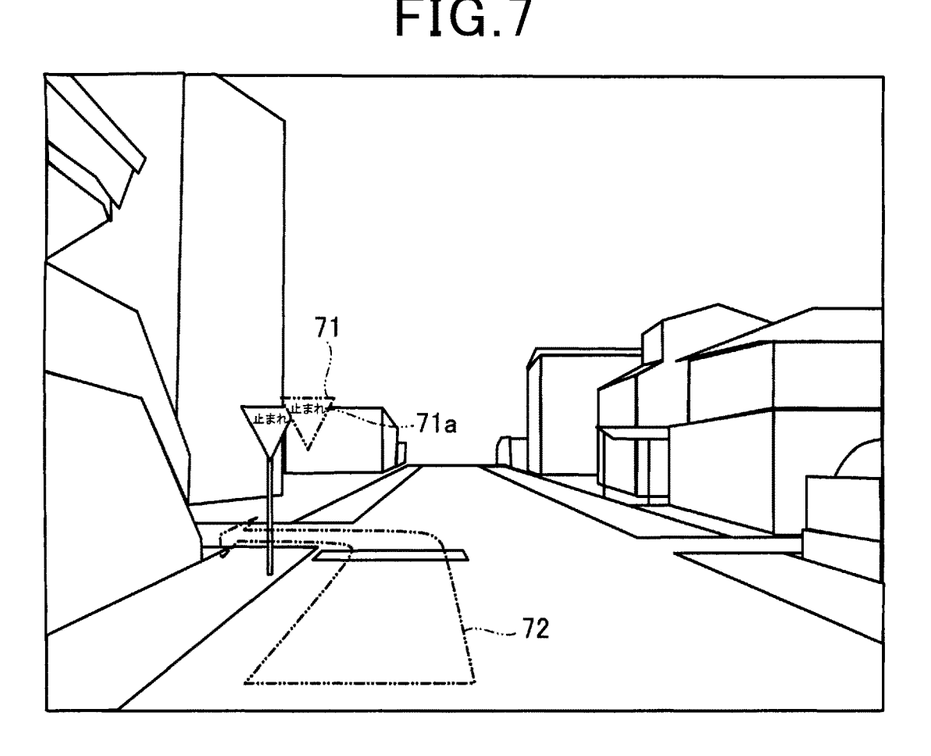
FIG. 7 is a schematic diagram illustrating an exemplary three-dimensional display displayed during the display process.

FIG. 7 is a schematic view illustrating an exemplary three-dimensional display displayed during a display process executed in this embodiment. That is, in FIG. 7, an external scenery viewable to the driver 3 is schematically shown. With the in-vehicle display system 10 of this embodiment, as shown in FIG. 7, a traffic sign 71 is converted into a three-dimensional display to increase visibility thereof thereby calling attention to it by the driver 3. Also, driving course information 72 notifying the driver 3 of a course of a vehicle 90 may be displayed to reduce deviation of a sight line of the driver 3 from a front side of the vehicle 90.

Further, with the in-vehicle display system 10 of this embodiment, when an object includes one or more characters (as a display), a display image is generated such that a three-dimensional display is displayed at a magnification ratio above a lower limit of a range in which the characters (i.e., the display) are readable. For example, characters 71a indicating stop in the traffic sign 71 shown in FIG. 7 are displayed in a reliably readable size to the driver 3.

As described heretofore, according to the in-vehicle display system 10 of this embodiment, the image generator 153 generates the display images used to provide the three-dimensional display fused and superimposed on the external scenery in the visual field in front of the driver 3 by decreasing a magnification ratio of the three-dimensional display to the geometric display size in accordance with the distance x between the driver 3 and the object. Hence, since the size of the three-dimensional display superimposed on the visual field of the driver 3 matches with size perceived by the driver 3, deviation between the size of the object in the visual field and the three-dimensional display displayed therein can be reduced. As a result, performance of perceiving the object by the driver 3 can be improved.

Further, according to the in-vehicle display system 10 of this embodiment, the image generator 153 generates the display images such that brightness of the three-dimensional display increases in accordance with the distance between the driver 3 and the object. Hence, deviation in brightness perceived by the driver 3 in accordance with the distance when the three-dimensional display is generated can be reduced. As a result, discomfort due to a size of the object caused by the brightness deviation can be either reduced or eliminated thereby enabling further improved perceptive performance of the driver 3 perceiving the object.

Further, according to the in-vehicle display system 10 of this embodiment, the emission unit 13 emits the display image generated by the image generator 153 as the projection light L1. Then, the reflective unit 14 reflects and combines the projection light L1 with the external light L2 and lets the combined light L3 to arrive at the eyeball 3A of the driver 3 combined together with the projection light L1. Hence, the three-dimensional display can be superimposed on the visual field of the driver 3.

Further, according to the in-vehicle display system 10 of this embodiment, the image generator 153 generates the display images to indicate the driving course information 72 to notify the vehicle 90 of the driving course. Hence, since not only the object in the visual field but also the driving course of the vehicle 90 is superimposed on the visual field, perception performance of the driving course can be improved while enabling safety drive of the vehicle 90.

Figure 8:
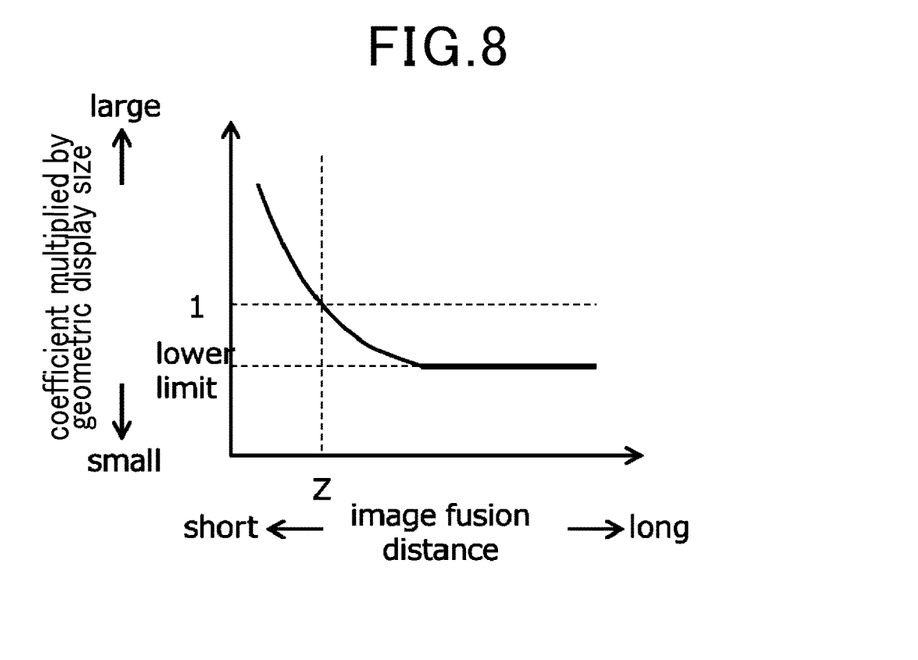
FIG. 8 is a graph illustrating an exemplary relation between an image fusion distance and a coefficient multiplied by a geometric display size enabling a character display to be readable according to one embodiment of the present disclosure.

Further, according to the in-vehicle display system 10 of this embodiment, when the object includes the character display, the image generator 153 generates the display images such that the three-dimensional display is displayed at the magnification ratio above the lower limit (see FIG. 8) of a range in which the character display is readable. Hence, since an image display unit can display the character readable display as the three-dimensional display in the visual field of the driver 3, the driver 3 can easily acquire the character information.

Now, exemplary modifications of the present disclosure are herein below described. That is, the present disclosure is not limited to the above-described embodiment and includes various modifications thereof which do not deviate from a gist thereof, as herein below described, for example.

First, in the above-described embodiment, the in-vehicle display system 10 superimposes the three-dimensional display of the object on the visual field of the driver 3 who drives the vehicle 90. However, the field of view on which the three-dimensional display of the object is superimposed is not limited to that viewed from the driver 3. That is, the field of view can be one viewed from an occupant other than the driver 3 of the vehicle 90, who does not drive the vehicle 90. In such a situation, since the occupant does not drive the vehicle but acquires information on an object outside the vehicle 90, identification of the object is eased and perceptive performance thereof can be improved. As a result, the information on the object outside the vehicle 90 can be easily acquired.

Secondly, in the above-described embodiment, the magnification coefficient multiplied by the geometrically determined size of the three-dimensional display changes at a given ratio in accordance with the distance between the occupant including the driver 3 and the object. However, the magnification coefficient multiplied by the geometrically determined size is not limited thereto.

Thirdly, in the above-described embodiment, the image generator 153 generates the display images such that the brightness of the display image is increased in accordance with the distance between the driver 3 and the object while simultaneously reducing the magnification coefficient multiplied by the geometrically determined display size in accordance with the distance therebetween. However, the display image can be generated simply such that the magnification coefficient multiplied by the geometrically determined display size is decreased in accordance with the distance between the driver 3 and the object.

Fourthly, in the above-described embodiment, only one exemplary configuration of the in-vehicle display system 10 is employed. However, the configuration of the in-vehicle display system is not limited thereto. For example, the driver camera 12 can be composed of either a single camera or a plurality of cameras. Further, in the above-described embodiment, the driver camera 12 captures the image of the upper body of the driver 3 including his or her face. However, instead of the driver camera 12 capturing the image of the upper body of the driver 3, a device for acquiring a position of the eyeball 3A of the driver 3 can be employed. Otherwise, a fixed value can be prepared in advance by anticipating the observation position from which the driver 3 observes.

Fifthly, in the above-described embodiment, the three-dimensional display displayed in the display process is composed of traffic signs and course guidance. However, the three-dimensional display is not limited thereto. Further, the three-dimensional display can include various aspects, such as characters, graphics, symbols, combinations thereof, etc. Furthermore, the three-dimensional display is not limited to still images and can be a video.

Sixthly, in the above-described embodiment, when the three-dimensional display is displaying characters, the image generator 153 generates the display images such that the three-dimensional display is displayed at the magnification ratio rate above the lower limit of a range in which the three-dimensional display is readable. However, the lower limit can be omitted.

As described heretofore, according to the first embodiment of the present disclosure, a novel in-vehicle display system for superimposing a three-dimensional display indicating an object observed by an occupant riding in a vehicle on a visual field of the occupant is provided. That is, the in-vehicle display system comprises an imaging unit to image a visual field and capture an image of the visual field; a detector to detect a position of an eyeball and a sight line of the occupant; and a visual point identifier to identify a position of a visual point of the occupant in the visual field based on the image of the visual field, the eye position and the sight line direction of the occupant. The in-vehicle display system further includes a measuring unit to measure a position and a distance of an object included in the image of the visual field based on the image of the visual field. The in-vehicle display system further includes an image generator to generate a display image based on the eyeball position of the occupant and the position and the distance of the object. The display image is used to provide a three-dimensional display fused in the visual field. The display image is generated at a given magnification coefficient multiplied by a geometrically determined size of the three-dimensional display. The given magnification ratio is reduced in accordance with a distance between the occupant and the object. The in-vehicle display system further includes an image display unit to display the display image generated by the image generator in the visual field of the occupant.

With this configuration, the image generator generates the display images to provide the three-dimensional displays fused and displayed in the field of view of the occupant. More specifically, the image generator generates the display images at a given magnification coefficient multiplied by a geometrically determined size of three-dimensional displays, which is decreased in accordance with the distance between the occupant and the object. Here, the geometrically determined magnification ratio of the display size of the three-dimensional display represents a magnification ratio that changes at a constant ratio in accordance with the distance between the occupant and the object, for example. By contrast, with the configuration of the present disclosure, since the magnification ratio is reduced in accordance with the distance between the occupant and the object, the image generator generates an increasingly smaller display image than a geometrically determined display size of the three-dimensional display as the distance between the occupant and the object increases. Hence, since the size of a fused three-dimensional display superimposed on the visual field of the occupant matches with a size perceived by the occupant, deviation between a size of the object in the visual field and the fused three-dimensional display displayed therein can be reduced. As a result, performance of perceiving the object by the occupant can be improved. Further, when the occupant does not drive the vehicle but acquires information on an object outside the vehicle, identification of the object is eased and perceptive performance thereof can be improved. As a result, the information on the object outside the vehicle 90 can be easily acquired.

Further, according to the second embodiment, the image generator generates the display images such that brightness of the three-dimensional display increases in accordance with the distance between the occupant and the object. According to this configuration, the image generator generates display images such that brightness of the three-dimensional display increases in accordance with the distance between the occupant and the object. Hence, deviation of brightness perception of the occupant generally caused in accordance with the distance when the fused three-dimensional display is generated can be reduced. As a result, discomfort due to a size of the object caused by the brightness deviation can be either reduced or eliminated thereby enabling further improved perceptive performance of the driver 3 perceiving the object.

Further, according to the third embodiment, the image display unit further includes an emitting unit to emit a projection light including the display image. The image display unit further includes a reflective unit to reflect the projection light and generate virtual display images on a virtual display plane based on the display image so that the three-dimensional display is generated by fusing virtual display images and is displayed in the visual field of the occupant. According to this configuration, since the reflective unit is provided in the image display unit to reflect the projection light emitted by the emitting unit, the fused three-dimensional display can be displayed in the field of view.

Further, according to the fourth embodiment, the image generator generates the display images for generating the three-dimensional display indicating the course of the vehicle operated by the occupant. The three-dimensional display is located in the vicinity of the object in the visual field of the occupant. According to this configuration, the image display unit can superimpose not only the three-dimensional display of the object but also the three-dimensional display indicating the course of the vehicle in the field of view. Hence, since perceptive performance of perceiving course information is improved, the occupant can more safely operate the vehicle.

Further, according to fifth embodiment, the image generator generates the display images such that the three-dimensional display is displayed at a magnification ratio above a lower limit of the magnification ratio in a range in which characters are readable in the three-dimensional display when the object includes the character. According to this configuration, the image display unit can display characters readable to the occupant in the three-dimensional display in the visual field of the occupant. Hence, the occupant can easily read the character information.

The present invention can be implemented in various embodiments. For example, the present invention can be implemented in a vehicle-mounted display device, a vehicle system comprising a vehicle-mounted display device, and a control method of controlling these devices and systems. The present invention can also be implemented in a computer program executed in these devices and systems, a server device for distributing computer programs, and a storage medium not temporary storing the computer program.

Numerous additional modifications and variations of the present disclosure are possible in light of the above teachings. It is therefore to be understood that within the scope of the appended claims, the present disclosure may be executed otherwise than as specifically described herein. For example, the present disclosure is not limited to the above-described in-vehicle display system and may be altered as appropriate. Further, the present disclosure is not limited to the above-described method of superimposing a three-dimensional display on a visual field of an occupant riding in a vehicle and may be altered as appropriate. Further, the present disclosure is not limited to the above-described non-transitory computer readable medium storing program for controlling a computer to perform a method of superimposing a fused three-dimensional display on a visual field of an occupant riding in a vehicle and may be altered as appropriate.

What is claimed is:

1. An in-vehicle display system for superimposing a three-dimensional display indicating an object observed by an occupant riding in a vehicle on a visual field of the occupant, the in-vehicle display system comprising;
   an imaging unit to image a visual field and capture an image of the visual field; a detector to detect a position of an eyeball and a sight line of the occupant;
   a visual point identifier to identify a position of a visual point of the occupant in the visual field based on the image of the visual field, the eye position and the sight line direction of the occupant;
   a measuring unit to measure a position and a distance of an object included in the image of the visual field based on the image of the visual field;
   an image generator to generate binocular parallax display images at a given magnification ratio, the display images being separately displayed side by side to be visible to eyeballs of the occupant on a virtual plane and fused on a fusion plane located further than the virtual plane from the occupant to be perceived by the occupant as a three-dimensional display in the visual field; and
   an image display unit to provide the virtual plane and the fusion plane to the occupant in the visual field,
   wherein the given magnification ratio is calculated in accordance with the eye position of the occupant and the position and the distance of the object,
   wherein the given magnification ratio is calculated by increasingly reducing a geometrically determined magnification ratio calculated based on a visual angle formed by the object, in which a rate of the reducing of the geometrically determined magnification ratio increases as the distance between the occupant and the object increases, and
   wherein the image generator generates display images fused as a three-dimensional display at a magnification ratio more than a lower limit enabling a character to be readable in the three-dimensional display when the object includes the character.

2. The in-vehicle display system according to claim 1, wherein the image generator generates the display images to cause the three-dimensional display to be brighter as the distance between the occupant and the object increases.

3. The in-vehicle display system according to claim 1, wherein the image display unit further includes:
   an emitting unit to emit projection light including the binocular parallax display images, and
   a reflective unit to reflect and direct the projection light to the occupant.

4. The in-vehicle display system according to claim 1, wherein the image generator generates the display images to be fused as a three-dimensional display indicating a drive course for the vehicle to follow,
   wherein the three-dimensional display is displayed in the vicinity of the object on the visual field of the occupant.

5. A method of superimposing a three-dimensional display on a visual field of an occupant riding in a vehicle, the method comprising the steps of:
   imaging a visual field of the occupant and capturing an image of the visual field;
   detecting an eyeball position and a sight line of the occupant;
   identifying a position of a visual point of the occupant in the visual field based on the image of the visual field, the eyeball position and the sight line direction of the occupant;
   measuring a position and a distance of an object included in the image of the visual field based on the image of the visual field;
   calculating a given magnification ratio of a three-dimensional display to be displayed in the visual field by increasingly reducing a geometrically determined magnification ratio calculated based on a visual angle formed by the object, in which a rate of the reducing of the geometrically determined magnification ratio increases as the distance between the occupant and the object increases;
   generating display images to be separately displayed side by side to be visible to eyeballs of the occupant on a virtual plane, fused on a fusion plane located further than the virtual plane from the occupant, and displayed as the three-dimensional display at the given magnification ratio in the visual field, wherein one or more of the display images fused as a three-dimensional display are generated at a magnification ratio more than a lower limit enabling a character to be readable in the three-dimensional display when the object includes the character; and
   displaying the three-dimensional display in the visual field of the occupant.

6. A non-transitory computer readable medium storing program for controlling a computer to perform a method of superimposing a fused three-dimensional display on a visual field of an occupant riding in a vehicle, the method comprising the steps of:
   imaging a visual field of the occupant and capturing an image of the visual field; detecting an eyeball position and a sight line of the occupant;
   identifying a position of a visual point of the occupant in the visual field based on the image of the visual field, the eyeball position and the sight line direction of the occupant;
   measuring a position and a distance of an object included in the image of the visual field based on the image of the visual field;
   calculating a given magnification ratio at which a three-dimensional display is displayed in the visual field by increasingly reducing a geometrically determined magnification ratio calculated based on a visual angle formed by the object, in which a rate of the reducing of the geometrically determined magnification ratio increases as the distance between the occupant and the object increases;

generating display images to be separately displayed side by side to be visible to eyeballs of the occupant on a virtual plane, fused on a fusion plane located further than the virtual plane from the occupant, and displayed as the three-dimensional display at the given magnification ratio in the visual field, wherein one or more of the display images fused as a three-dimensional display are generated at a magnification ratio more than a lower limit enabling a character to be readable in the three-dimensional display when the object includes the character; and displaying the three-dimensional display in the visual field of the occupant.

\* \* \* \* \*